(12) United States Patent
Hollberg et al.

(10) Patent No.: US 8,039,095 B2
(45) Date of Patent: Oct. 18, 2011

(54) LAMINATE ELECTRICAL INSULATION PART

(75) Inventors: Peter J. Hollberg, Midlothian, VA (US); Mikhail R. Levit, Glen Allen, VA (US); Brian P. Little, Midlothian, VA (US); Xun Ma, Midlothian, VA (US); Brian Keith Trask, Midlothian, VA (US); Roger Curtis Wicks, Colonial Heights, VA (US); Bruce A. Yost, Landenberg, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 360 days.

(21) Appl. No.: 11/804,531

(22) Filed: May 18, 2007

(65) Prior Publication Data

US 2008/0286591 A1    Nov. 20, 2008

(51) Int. Cl.
*B32B 7/02* (2006.01)
(52) U.S. Cl. ............... 428/220; 428/212; 428/411.1
(58) Field of Classification Search ........... 428/195.1, 428/212, 220, 411.1
See application file for complete search history.

(56) References Cited

U.S. PATENT DOCUMENTS

| | | | |
|---|---|---|---|
| 4,118,372 A | 10/1978 | Schaefgen | |
| 5,248,530 A | 9/1993 | Jester et al. | |
| 5,498,464 A * | 3/1996 | Ikejima et al. | 428/195.1 |
| 5,885,909 A | 3/1999 | Rudisill et al. | |
| 6,548,431 B1 | 4/2003 | Bansal et al. | |
| 2005/0130545 A1 | 6/2005 | Bansal et al. | |

FOREIGN PATENT DOCUMENTS

JP    11-170467    6/1989

OTHER PUBLICATIONS http://en.wikipedia.org/wiki/Polyethylene_terephthalate, May 2008.*
Teruhisa et al, JP 11-170467 machine translation, Jun. 29, 1999.*

\* cited by examiner

*Primary Examiner* — David Sample
*Assistant Examiner* — Lawrence Ferguson

(57) ABSTRACT

This invention relates to a laminate electrical insulation part for an electrical device comprising a thermoplastic film positioned between, adjacent to, and attached to two nonwoven sheets. Each of the nonwoven sheets consists of multicomponent polymeric fibers comprising at least a first polymer and a second polymer, the first polymer having a melting point that is at least 15 degrees Celsius lower than both the melting point of the second polymer and the melting point of the thermoplastic film, and the film is attached to the nonwoven sheets by the first polymer in the nonwoven sheets. The electrical insulation part has a breakdown voltage of at least 3 kilovolts, and a surface having a dynamic frictional coefficient of 0.25 or less. This invention also relates to an electrical device component comprising the laminate electrical insulation part.

13 Claims, 3 Drawing Sheets

LAMINATE ELECTRICAL INSULATION PART

BACKGROUND OF THE INVENTION

1. Field of Invention

The present invention relates to a laminate electrical insulation part for an electrical device having a component, such as a core, provided with a plurality of slots to receive coils of current-carrying wire. Such laminate electrical insulation parts include, for example, a slot liner, a closure, a wedge, or a stick comprising a dielectric polymer film and at least one nonwoven sheet attached to each side of the dielectric polymer film solely by thermal bonding of the nonwoven sheets to the film.

2. Description of the Related Art

The Japanese Patent Publication Hei 11[1999]-170467 of Miki, et al. discloses a polyester composite material that can be used as a highly heat resistant electric insulating material characterized by the fact that it was prepared by thermally bonding on one surface or both surfaces of a polyester film a polyester nonwoven fabric made of polyester principal fibers and thermally fusible binder fibers having a melt point 5-50 degrees C. lower than the melting point of the principal fibers. The ratio of principal fibers to binder fibers in the nonwoven fabric should be in the range of 70:30 to 40:60, preferably 65:35 to 45:55. Therefore about half of the fibers at the surface of the nonwoven are binder fibers available for attaching the nonwoven sheet to the film. This publication further states that when the proportion of the binder fibers increases above 60 weight percent the heat resistance of the polyester composite material becomes lower. Therefore, adding additional binder fiber to the nonwoven sheet to increase the adhesion of the nonwoven sheet to the film is not a realistic option.

The integrity of the laminate structure is an important property for electrical laminate insulation parts. It is important that these laminate parts have adequate stiffness or rigidity, have a low surface friction coefficient, and that they do not readily delaminate, such as when slot liners are inserted into the slots of electrical device components or when conductors or wires come in contact with the slot liners during installation. Therefore it is desirable that both sides of the film be fully and uniformly bonded (i.e. over the film's entire surface) to the adjacent nonwoven sheets. Further, because stiffness or rigidity is important to these parts, generally highly crystallized films are used, for example bi-axially oriented PET film. This stiffness also makes it more difficult to adhere the film to the nonwoven sheets.

Because of these problems and requirements, most laminate electrical insulation parts use solvent-based thermoset adhesives to adhere nonwoven sheets to the polymer film. However, the commercial use of additional solvent-based adhesives generally requires continuous solvent-based processes and all the technological and safety complications related to dealing with volatile organics (ventilation, recuperation of the solvent, etc.). If the adhesive is solvent-free, similar complications are usually related to safety aspects of monomers, for they can also have a low vapor pressure, be volatile, and/or be a health hazard. Also, there is a perception by some in the industry that such adhesive laminates have a short shelf life; that is, they should be stored for only a few months prior to being installed in electrical devices. In addition there is a perception by some that parts made from adhesively-attached laminates may gradually and progressively delaminate while in service if the parts were improperly flexed, for example during installation, or if the adhesive bond was not properly achieved when the laminate was made. Still others perceive that the addition of an adhesive provides yet another material to the laminate part that because of differing thermal expansion coefficients is more apt to have delamination issues as the part cycles through periods of higher and lower temperature.

Therefore, what is needed is a laminate electrical insulation part comprising nonwoven sheets attached to a film wherein the nonwoven sheets provide uniform adhesion over the full interface between the nonwoven sheets and the film and other desirable attributes while avoiding the use of adhesives, solvents, or other environmentally unfriendly substances.

SUMMARY OF THE INVENTION

This invention relates to a laminate electrical insulation part for an electrical device comprising a thermoplastic film positioned between, adjacent to, and attached to two nonwoven sheets. Each of the nonwoven sheets consists of multicomponent polymeric fibers comprising at least a first polymer and a second polymer, the first polymer having a melting point that is at least 15 degrees Celsius lower than both the melting point of the second polymer and the melting point of the thermoplastic film, and the film is attached to the nonwoven sheets by the first polymer in the nonwoven sheets. The electrical insulation part has a breakdown voltage of at least 3 kilovolts, and a surface having a dynamic frictional coefficient of 0.25 or less. This invention also relates to an electrical device component comprising the laminate electrical insulation part.

DETAILED DESCRIPTION OF THE DRAWINGS

Figure 1:
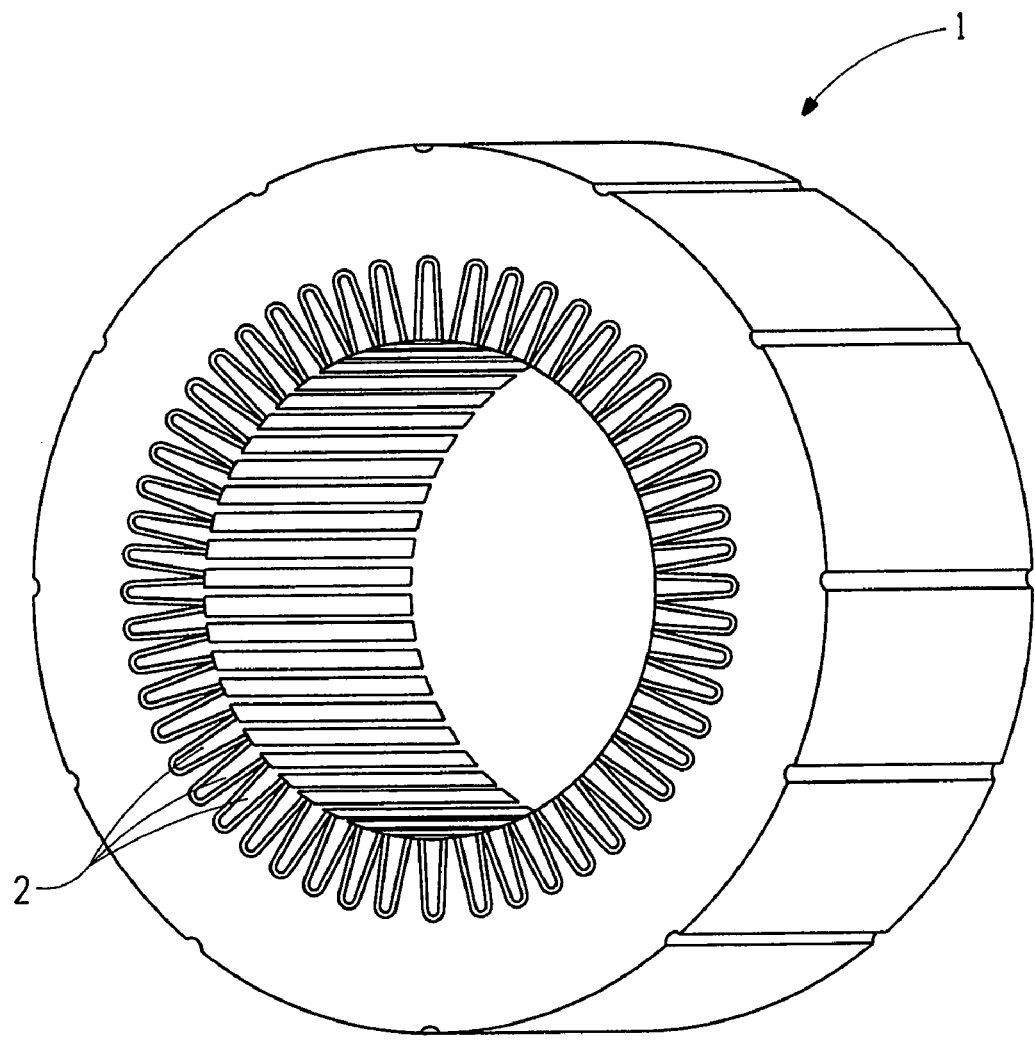
FIGS. 1 and 2 are representations of insulated slots in an electrical device.

This invention relates to a laminate electrical insulation part for an electrical device having a component provided with a plurality of slots to receive coils of current-carrying wire, such as an electrical motor or generator. The laminate electrical insulation part comprises a thermoplastic film positioned between, adjacent to, and attached to two nonwoven sheets.

The laminate electrical insulation part uses nonwoven sheets made from multicomponent fibers. By multicomponent fibers it is meant the fiber is comprised of more than one polymer. In one preferred embodiment the fiber is bicomponent, meaning it is melt spun with two thermoplastic polymers in either a sheath-core arrangement or a side-by-side arrangement. The phrase "more than one polymer" is meant to include not only polymers having different chemical structures, but polymers having similar structures but having different melting points. For example, one preferred embodiment is a nonwoven sheet made from sheath/core fibers wherein the sheath is a polyester copolymer or terpolymer and the core is a polyester homopolymer. Any combination of polymers may be used as long as one of the polymers in the multicomponent fiber has a melting point at least 15 degrees Celsius lower than both one of the other polymer(s) in the fiber and the melting point of the film. Further, in one embodiment the polymers can be arranged in the multicomponent fiber in any manner as long as the lower melting point polymer is present at a surface of the fiber. In a preferred embodiment the lower melting point polymer forms the sheath of a sheath/core fiber and the higher melting point polymer forms the core.

Any nonwoven process that forms a nonwoven sheet having multicomponent fibers can be used, including processes that form the sheet solely from multicomponent fibers in staple form. Such staple fiber nonwovens can be prepared by a number of methods known in the art, including carding or garneting, air-laying, or wet-laying of fibers. The staple fibers preferably have a denier per filament between about 0.5 and 6.0 and a fiber length of between about 0.6 cm and 10 cm.

In some embodiments the fibers in the nonwoven sheet are generally continuous filaments directly spun into the sheet without any intentional cutting of the filaments. In some preferred embodiments the nonwoven sheet is made from processes used to spin and consolidate continuous filament thermoplastic webs known in the art such as spunbonding and meltblowing. Multiple component spunbonded webs suitable for preparing laminate parts can be prepared using methods known in the art, for example as described in U.S. Pat. No. 6,548,431 to Bansal et al. In one preferred embodiment, the multicomponent fibers are incorporated into a nonwoven sheet by melt spinning fibers from spinning beams having a large number of holes onto a moving horizontal belt as is disclosed in U.S. Pat. No. 5,885,909 to Rudisill et al. In some embodiments the continuous filament webs suitable for preparing the nonwoven fabrics preferably comprise continuous filaments having a denier per filament between about 0.5 and 20, in some embodiments a preferred denier per filament range is about 1 and 5.

The preferred form of the nonwoven sheet used in the laminate is a lightly thermally-bonded sheet. Such lightly thermally-bonded sheet can be prepared, for example, by thermal bonding of the spun sheet in the nip between an embosser roll and an anvil roll using low nip pressure (100-300 N/cm) and a temperature much below the melting point of low meltable polymer. Such technique is described in Bansal et al United States Patent Application 2005/0130545 to Bansal et al. The resulting sheet structure has enough mechanical integrity for subsequent processing while still retaining enough bulk and formability to be laminated with sufficient bond strength in the final product.

The multicomponent fibers of the nonwoven sheet can include combinations of different polyesters and co-polyesters, poly(phenylene sulfide) and polyester, and the like, as long as the difference between the lowest melting point fiber polymer and a higher melting point polymer in the fiber is at least 15° C. and the melting point of the lowest melting point polymer is at least 15° C. below melting point of the film. This allows the final nonwoven to contribute good tear properties to the final laminate structure. In some embodiments the difference between the melting points of the polymers is about 15° C. to 100° C.; in some other embodiments the difference between the melting points of the polymers is about 15° C. to 50° C.

In some embodiments, the low melting point polymer is present in each individual multicomponent filament in about 10 to 50 percent by weight. If less than 10 weight percent low melting point polymer is present in the multicomponent fiber, it is thought this is not a sufficient amount of polymer to fully and uniformly bond the nonwoven with the film. Amounts in excess of 50 weight percent are thought to adversely affect the tear properties of the final laminate structure and its ability to be impregnated with a varnish or matrix resin while inserted in the electrical device. Regardless of the actual percentage of the lower melting point polymer in the multicomponent fiber, in a preferred embodiment this lower melting point polymer is uniformly distributed along the axis of the multicomponent fiber, so that any fiber in the nonwoven sheet that is at the surface of the nonwoven sheet has lower melting point polymer available for bonding with the film.

While a single layer nonwoven structure is a preferred embodiment, a multi-layer nonwoven could be used as long as the layer of the multi-layer nonwoven that is in contact with the film is made from the multicomponent fibers as previously described. Basis weight and thickness of the nonwoven sheet is not critical and is dependent upon the end use of the final laminate. In some preferred embodiments the basis weight is 60 to 100 grams per square meter and the final thickness of the nonwoven sheets in the laminate structure is 75 to 125 micrometers. The polymeric components forming the multicomponent fibers can include conventional additives such as dyes, pigments, antioxidants, ultraviolet stabilizers, spin finishes, and the like.

The thermoplastic film can be made from polyester, polyamide, poly(phenylene sulfide) (PPS), and/or other thermoplastic materials. The thermoplastic film can be a homogeneous material or it can be layered structure with different thermoplastics in different layers. In some embodiments, the preferred polyesters include poly(ethylene terephthalate), poly(ethylene naphthalate), and liquid crystalline polyesters.

Poly(ethylene terephthalate) (PET) can include a variety of comonomers, including diethylene glycol, cyclohexanedimethanol, poly(ethylene glycol), glutaric acid, azelaic acid, sebacic acid, isophthalic acid, and the like. In addition to these comonomers, branching agents like trimesic acid, pyromellitic acid, trimethylolpropane and trimethyloloethane, and pentaerythritol may be used. The poly(ethylene terephthalate) can be obtained by known polymerization techniques from either terephthalic acid or its lower alkyl esters (e.g. dimethyl terephthalate) and ethylene glycol or blends or mixtures of these. Poly(ethylene napthalate) (PEN) can be obtained by known polymerization techniques from 2,6 napthalene dicarboxylic acid and ethylene glycol. Examples of commercially available PET and PEN films are MYLAR® and TEONEX® films respectively, sold by DuPont-Teijin Films.

By "liquid crystalline polyester" (LCP) herein is meant polyester that is anisotropic when tested using the TOT test or any reasonable variation thereof, as described in U.S. Pat. No. 4,118,372. One preferred form of liquid crystalline polyesters is "all aromatic"; that is, all of the groups in the polymer main chain are aromatic (except for the linking groups such as ester groups), but side groups which are not aromatic may be present. Possible LCP compositions for films and film types are described, for example, in U.S. Pat. No. 5,248,530 to Jester et al. One commercially available example of PPS film is TORELINA® film sold by Toray Company.

Other materials, particularly those often found in or made for use in thermoplastic compositions may also be present in the film. These materials should preferably be chemically inert and reasonably thermally stable under the operating environment of the part in service. Such materials may include, for example, one or more of fillers, reinforcing agents, pigments, and nucleating agents. Other polymers may also be present, thus forming polymer blends. In some embodiments, the composition can contain about 1 to about 55 weight percent of fillers and/or reinforcing agents, more preferably about 5 to about 40 weight percent of these materials.

In one embodiment the thermoplastic film can also contain an internal layer of thermoset material. For example, KAP- TON® EKJ film, sold by DuPont, has thermoplastic polyimide outside layers with a thermoset polyimide layer inside the structure.

The use in electrical insulation parts requires the thermoplastic film to be a true film, not simply a polymer coating or an extrusion on a nonwoven sheet that would not have adequate crystallinity and the corresponding stiffness and other mechanical properties plus thermal stability required by laminate electrical insulation parts. In some preferred embodiments the film is a bi-axially stretched film. Such film isn't required to have a preferred orientation and correspondingly has about the same stiffness in all directions plus no weak direction for tear. The melting point of the thermoplastic film should be on at least 15 degrees Celsius above melting point of the lowest meltable polymer in the nonwoven structure. This provides an adequate temperature difference during the thermal lamination process to create a good bond and will not cause any significant shrinkage or warpage of the film, or disturb its internal structure and corresponding physical and mechanical properties. The thermoplastic film has an initial modulus of at least 0.8 Pa, which along with the film thickness dictates the stiffness (the ability to bend) of the part. In one preferable embodiment, the initial modulus of the film is at least 2 GPa.

The thermoplastic film is positioned between, adjacent to, and attached to the two nonwoven sheets in the laminate electrical insulation part. That is, the thermoplastic film is sandwiched between the two nonwoven sheets. This allows the laminate electrical insulation part to be impregnated with a matrix resin either prior to installation in an electrical device, or after installation in the device. The thermoplastic film is attached to the nonwoven sheets only by the low melt point polymer in the nonwoven sheets. Since the nonwoven sheet layer immediately adjacent the film consists of multi-component filaments wherein the lower melt point polymer is available on the surface of those filaments for bonding, with the application of heat, and optionally pressure, substantially all of the surface fibers in contact with the film can bond with the film, creating what is believed to be a superior and more uniform full thermal bond between the nonwoven sheets and the film while maintaining the nonwoven sheet tear resistance and impregnability. No adhesives and/or organic solvents are required.

In one preferred embodiment, both nonwoven sheets are attached to the film to the same degree. This can be accomplished by using essentially identical nonwoven sheets on either side of the film, and then applying similar heat and pressure to both sides. Alternatively, the nonwoven sheets can be attached to the film in differing degrees, however, in practice this creates the need to keep track of which side is higher bonded and in general is not desired.

The thermal lamination process can be conducted as a continuous process by applying optimum temperature and pressure to the contact surface between the nonwoven sheet and the film. Alternatively, if desired a batch process can be used, using a platen press or similar type device. In the continuous process, calenders or double belt presses can be used. Heat can also be applied to the film and nonwoven sheets before applying pressure, or simultaneously with applying pressure, or the nonwoven sheets and/or film can be preheated prior to applying pressure and temperature.

The nonwoven sheets can be bonded to the film in one step from the both sides or in two steps; at first bon-ding from one side and after that, from the other side. In some preferred embodiments, the preferred type of the calender is a soft nip calender, in which each nip is created by two rolls: one hard metal roll and one composite roll. Typical materials of the composite rolls include aliphatic and aromatic polyamides and cotton (depending on required temperature and hardness).

The laminate electrical insulation parts can be used in electrical devices in many different forms. These laminate electrical parts function as electrical insulation, aid for the wire insertion in the slots, fixture of the wiring in the slots, and mechanical protection of the wiring. Two of the most common electrical device components with slots are rotors and stators. FIG. 1 is an illustration of one such device 1 having slots 2. If this electrical device component is stationary in the electrical device it is called a stator; if this electrical device component rotates it is called a rotor.

Figure 2:
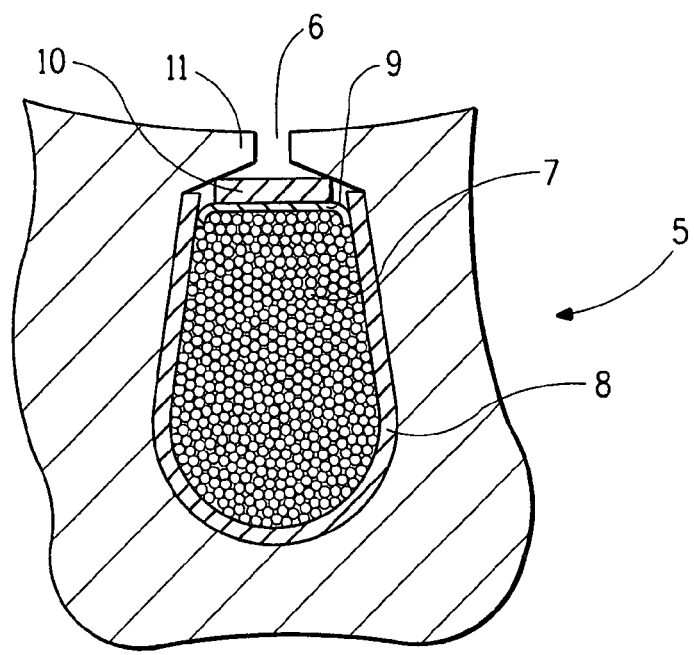
Figure 3:
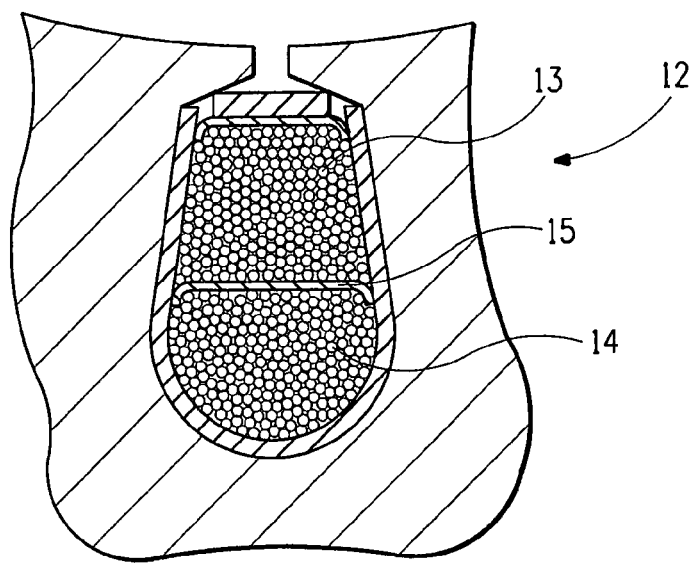
FIG. 3 is a representation of an electrical device known as a stator.
Figure 4:
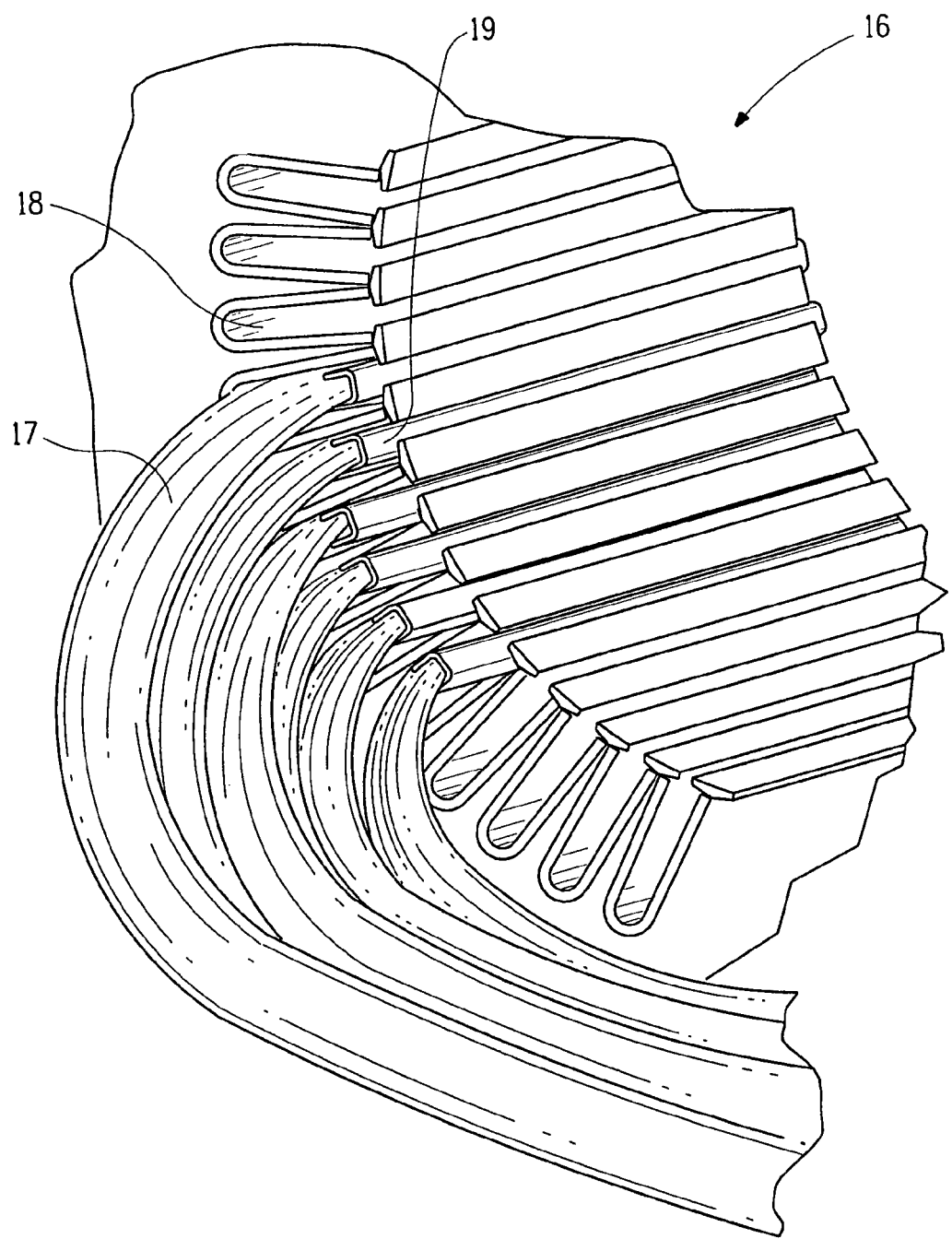
FIG. 4 is a representation of a stator showing the insulation parts and conductors with the stator.

These parts can include slot liners, wedges and/or sticks, slot liner covers, and other parts that could be die-cut from a laminate. The parts can be used in any electrical device; however, in many embodiments they are useful in electric motors and electric generators. FIGS. 2 and 3 disclose a typical embodiment of the laminate electrical insulation parts used in the slots of an electrical device. FIG. 2 is an illustration of a single-layer winding 5 in a slot 6 having a plurality of winding wires 7 and a layer of electrical insulation in the slot called a slot liner 8. Slot liners is an electrical insulation part that is used to line rotor or stator slots and insulate the rotor or stator winding wires from the stator or rotor metal itself, or other structural parts. The open end of the slot is closed with another layer of electrical insulation known as a slot cover or covering 9 and the assembly is mechanically held in place with a wedge 10 (also known as a stick or a topstick) that engages the lip 11 of the slot. The wedge is used to compact and contain the coil wires within the slot. FIG. 3 is an illustration of a two-layer winding 12 having two sets of winding wires 13 and 14 and another layer of insulation in the slot called a slot separator 15 (also known as a midstick or a center wedge) separating the two sets of wires. In this type of winding, the slot separator is used to separate and insulate the two windings from one another in the slot. FIG. 4 is an illustration of an electrical device component 16 showing some of the winding wires 17 in the slots 18; also shown is a combination slot cover and wedge 19 covering the slots.

The laminate electrical insulation parts can be produced by known techniques. For example, slot closures can be produced from narrow strips of laminate that are cut to the required length and then formed into a channel-shaped cross-section by mean of a punch and die. Slot liners can be produced by bending the edge margins of a tape of the laminate inwardly to form cuffs at the edge of the tape and cutting the cuffed tape to size with a stamping die of appropriate size prior to bending transversely to the cuffed edges into a configuration suitable for insertion into the slots of the electrical device component.

The laminate electrical insulation parts have a breakdown voltage of at least 3 kilovolts. The breakdown voltage of the laminate parts is mostly dependent on the selection of the type of film and its thickness. These parts have a surface having a dynamic frictional coefficient of 0.25 or less. Low dynamic frictional performance is important for the safe (without damage) insertion of slot liners into slots, insertion of the wiring into the slots on the top of the slot, liners, and insertion of slot covers, wedges, or sticks on the top of the filled slot. If the dynamic frictional coefficient is too high, then the laminate electrical insulation part will be abraided by either the slot or the wiring during manufacture, potentially compromising the performance of the electrical device. In some preferred embodiments, these laminate electrical insulation parts have a Normalized Bending Index of at least 30 because slot liners, and to a greater degree wedges and sticks, require stiffness to be inserted in the slot without any problems.

The laminate electrical insulation part can have, in addition, a matrix resin present in an amount of 10 to 50 percent by weight, based on the total weight of the electrical insulation part and the resin. Generally this is done to eliminate air from the part and provide improved thermal and dielectric properties to the insulation. In addition, there is some increase in stiffness to bend after such treatment. The resin can be applied to the part, cured or partially cured, and then installed in the slot of the electrical device component; or the part can be installed in the electrical device component, wound with wiring, and then the wound electrical device component having the part can be dipped or otherwise provided with adequate resin to substantially fully impregnate the part with matrix resin and encapsulate the electrical device component if desired. Alternatively, the part can be partially impregnated with a resin, installed in the electrical device component, and then further impregnated in a later step with the same or different resin. Once impregnated the part or device can be thermally cured to crosslink and harden the matrix resin. Useful resins include epoxy, polyester, polyurethane, polyesterimide, and the like.

Test Methods

Melting points were measured by ASTM Method D3418. Melting points are taken as the maximum of the melting endotherm and are measured on the second heat at a heating rate of 10° C./min.

The tensile properties of laminate structures of the present invention were measured on an Instron-type testing machine using test specimens 2.54 cm wide and a gage length of 18 cm, in accordance with ASTM D 828-93.

The thickness and basis weight of laminates of present invention were determined by measuring the thickness and the weight of an area of a sample of the test laminates in accordance with ASTM D 374-99 and ASTM D 646-96, respectively.

Initial tear strength (ITS) of laminates was measured based on ASTM D1004-07 at a grip distance of 7.6 cm.

Bond strength or ply adhesion between the film and the nonwoven sheet was measured based on ASTM F904-98 on strips 2.54 cm wide at speed of 12.7 cm/min.

Stiffness to bend for laminate was measured based on ASTM D747 with determination of Olsen Stiffness Index (OSI) by bending of a strip of the laminate 2.54 cm wide to 60 degrees bending angle and calculating the Index as:

$$OSI=(A/100 \times B)/(0.125D)$$

Where A=Mean upper scale reading when lower scale=60;
B=total torque, in—lb.;
D=specimen width-inches.

Normalized Stiffness Index (NSI) was defined as Olsen Stiffness Index divided by laminate thickness in the third degree:

$$NSI=OSI/(TH^3)$$

Where TH=specimen thickness in mm.

Coefficient of friction of the laminate surface was measured in accordance with ASTM D-1894 using Instron Coefficient of Friction Fixture with the polished stainless steel friction table with the maximum roughness depth of 37 microinches (0.9 micrometers).

Breakdown voltage of laminates was measured in accordance with ASTM D149-97a, Method A (short time test) using flat 51 mm diameter and 25 mm thick electrodes with edges rounded to 6.4 mm.

Example 1

Two layers of lightly thermally bonded spunbonded nonwoven sheets, each having a basis weight 61 g/m² and made from continuous fibers having a core/sheath structure, were prepared as described in U.S. Pat. Application 2005/0130545 (Bansal et al). Poly(ethylene terephthalate) (PET) was used in the fiber core and modified di-methyl isophthalate PET copolymer was used in the fiber sheath; the core part was 70 weight percent of the fiber structure and the sheath part was 30 weight percent of the fiber structure. The melting points for the core polymer and the sheath polymer were 265° C. and 216° C. respectively. A 75 micron-thick PET film (MYLAR® EL film sold by DuPont-Teijin Films) having an initial modulus of about 4 GPa and a melting point of 255° C. was preheated to 177° C. in an infrared oven, inserted between the two layers of nonwoven sheet and then in a single operation the combined layers were first calendered on the bottom and then the top through two soft nips of a Perkins calender with roll diameters of 45.7 cm. Each calender nip had a heated metal roll and a nylon composite backup roll. The speed was 15 m/min., the nip linear pressure was 3800 N/cm, and the heated metal roll temperatures were 199° C. The properties of the final laminate structure are shown in table 1. Samples of the laminate were put on Teflon®-impregnated glass fabric and aged for 1 hour in the oven at 200° C. and for 1 hour at 230° C. After removing from the oven, the samples were checked and no warpage or delamination was observed. Electrical insulation parts such as slot liners, wedges, or sticks can then be made from the laminate using known methods to cut the laminate to the required length and then forming the parts using a punch and dies.

Example 2

The laminate structure was prepared as in Example 1, except that the speed was 30.5 m/min. The properties of the final laminate structure are shown in Table 1. The laminate was cut into pieces and electrical insulation parts (slot liners and wedges) were made.

Example 3

The two layers of the nonwoven sheets of Example 1 were laminated, as in Example 1, with a 125 micron thick PET film (MYLAR® EL film sold by DuPont-Teijin Films) which had an initial modulus of about 4 GPa and a melting point of 255° C., with the exception that the lamination was conducted at a speed of 10.7 m/min, the nip linear pressure was 3500 N/cm, and the metal roll temperatures were 220 C. The produced laminate had basis weight of 302 g/m², a thickness 0.319 mm, a breakdown voltage of 13 kV, an average bond/peel strength between the film and the top and bottom nonwoven sheets was 1.50 and 1.45 N/cm, respectively, and both surfaces had a dynamic friction coefficient of 0.21. Electrical insulation parts such as slot liners, wedges, or sticks can then be made from the laminate using known methods to cut the laminate to the required length and then forming the parts using a punch and dies.

Example 4

The process of Example 1 can be repeated but with the following exceptions. The lightly thermally bonded spunbonded nonwoven sheets is made from fibers having poly (phenylene sulfide) in the core and modified di-methyl isophthalate PET copolymer in the sheath with the core part being 80 weight percent of the fiber structure and sheath part being 20 weight percent of the fiber structure. The polymers in the core and in the sheath have melting points of 285° C. and 216° C., respectively. The nonwoven sheets have a basis weight of 86 g/m² each and are laminated with 75 micron thick poly (ethylene naphthalate) film (TEONEX® film type Q51 sold by DuPont-Teijin Films) having a melting temperature of 270° C. and an initial modulus about 4.5 GPa. Electrical insulation parts such as slot liners, wedges, or sticks can then be made from the laminate using known methods to cut the laminate to the required length and then forming the parts using a punch and dies.

For comparison, Table 1 also includes the properties of the standard adhesively bonded polyester nonwoven-polyester film laminates. In the standard designation, "D" stands for DACRON® and "M" stands for MYLAR®. "70" means that the laminate was not additionally impregnated or saturated and "100" means that the laminate was additionally impregnated or saturated with a resin. As can be seen from the table, the laminate electrical insulation parts made without adhesive have properties equivalent or superior to the properties of the adhesively bonded laminates. The stiffness of the laminates without adhesive are higher than the DMD 70 laminates and can be even higher than the DMD 100 laminates if good bond strength is developed during the lamination process. This can be very useful particularly for the sticks and the wedges. It can be seen from the same table, that initial tear strength of the laminates of this invention can be higher than initial tear strength of adhesively bonded laminates of about the same or even higher basis weight.

Also, as shown in the Table, the top and bottom surfaces of the film are attached to the nonwoven sheets to the same degree; that is, the bond strength of the laminate electrical insulation parts is very close from side A to side B with the difference being not more than 30 relative percent. This is important for the electrical part manufacturing in that the installer does not have to consider what side of the laminate structure will later face the wire. The overall level of the bond between the film and the nonwoven can be adjusted by adjustment of the lamination process conditions as illustrated by comparing the changes in processing conditions between Examples 1 and 2 and, correspondingly, meet the requirements of the particular part for the particular application.

TABLE 1

Properties of the laminate electrical insulation part

| Laminate ID | Basis weight, g/m2 | Thickness, mm | Breakdown voltage, kV | Peel strength, maximum, N/cm Side A/Side B | Peel strength, average, N/cm Side A/Side B | Olsen Stiffness Index MD/CD | Normalized Stiffness Index MD/CD | ITS N MD/CD |
|---|---|---|---|---|---|---|---|---|
| Example 1 | 241 | 0.285 | 9 | 6.4/4.9 | 4.6/3.6 | 1.52/1.18 | 66/51 | 58/53 |
| Example 2 | 240 | 0.235 | 9 | 2.7/2.6 | 1.9/1.6 | 0.65/0.55 | 50/42 | 58/49 |
| DMD (3-3-3) 100* | 282 | 0.216 | 12 | | | 0.61/0.57 | 61/57 | 53/40 |
| DMD (3-3-3) 70* | 237 | 0.214 | 9 | | | 0.39/0.38 | 39/38 | 47/28 |

*Sold by Fabrico Atlanta (Kennesaw, GA)

Celsius lower than both the melting point of the second polymer and the melting point of the thermoplastic film; the thermoplastic film attached to the nonwoven sheets by the first polymer in the nonwoven sheets, and wherein, the electrical insulation part has a breakdown voltage of at least 3 kilovolts, and a surface having a dynamic frictional coefficient of 0.25 or less, with the proviso that a fiber of the multicomponent polymer fibers is a bicomponent fiber and contains the first polymer and the second polymer in either:

(i) a sheath core arrangement with the sheath including the first polymer and the core including the second polymer or, (ii) a side-by-side arrangement.

2. The laminate electrical insulation part of claim 1, having a Normalized Stiffness Index of at least 30.

3. The laminate electrical insulation part of claim 1 wherein, the thermoplastic film is attached to each of the two nonwoven sheets to the same degree.

4. The laminate electrical insulation part of claim 1, in the form of a slot liner.

5. The laminate electrical insulation part of claim 1, in the form of a closure, a wedge or a stick.

6. The laminate electrical insulation part of claim 1 wherein, the thermoplastic film is a polyester film.

7. The laminate electrical insulation part of claim 1 wherein, the thermoplastic film has an initial modulus of at least 0.8 GPa.

8. The laminate electrical insulation part of claim 1 wherein, the first or second polymer is polyester.

9. The laminate electrical insulation part of claim 1 wherein, the first polymer is a copolymer or terpolymer and the second polymer is a homopolymer.

10. The laminate electrical insulation part of claim 1 wherein, the multicomponent polymeric fibers have a sheath/core construction with the sheath including the first polymer and the core including the second polymer.

11. The laminate electrical insulation part of claim 1 wherein, the multicomponent polymeric fibers have a side-

What is claimed is:

1. A laminate electrical insulation part for an electrical device comprising:
a thermoplastic film positioned between, adjacent to, and attached to two nonwoven sheets, each of the nonwoven sheets consisting of multicomponent polymeric fibers comprising:
at least a first polymer and a second polymer, the first polymer having a melting point that is at least 15 degrees by-side construction with one side including the first polymer and the other side including the second polymer.

12. The laminate electrical insulation part of claim 1 wherein, the multicomponent polymeric fibers are continuous filaments.

13. An electrical device comprising the laminate electrical insulation part of claim 1.

* * * * *